April 10, 1956 W. L. THAYER ET AL 2,741,450
LOADER FOR CONTAINERS AND SCALE COMBINATION
Filed Oct. 31, 1951 6 Sheets-Sheet 1

INVENTORS
Warren L. Thayer
Floyd L. Thayer
By Kenway, Jenney, Witter & Hildreth
Attys.

Fig. 4

April 10, 1956    W. L. THAYER ET AL    2,741,450
LOADER FOR CONTAINERS AND SCALE COMBINATION
Filed Oct. 31, 1951    6 Sheets-Sheet 4

INVENTORS
Warren L. Thayer
Floyd L. Thayer
By Kenway, Jenney, Witter & Hildreth
Attys.

April 10, 1956 W. L. THAYER ET AL 2,741,450
LOADER FOR CONTAINERS AND SCALE COMBINATION
Filed Oct. 31, 1951 6 Sheets-Sheet 6

Fig. 9

INVENTORS
Warren L. Thayer
Floyd L. Thayer
By Kenway, Jenney, Witter & Hildreth
Attys.

United States Patent Office 2,741,450
Patented Apr. 10, 1956

2,741,450

LOADER FOR CONTAINERS AND SCALE COMBINATION

Warren L. Thayer and Floyd L. Thayer, Hingham, Mass.

Application October 31, 1951, Serial No. 254,004

5 Claims. (Cl. 249—17)

This invention relates to apparatus for filling containers to a given weight of material, and more particularly to automatic filling apparatus employing a counterbalance type scale and mechanism in conjunction with the weigh beam of such scale whereby both the accuracy and speed of loading are greatly enhanced.

In one aspect this invention consists in the combination of loading mechanism and a scale with an improved suspension arrangement particularly adapted for rapid response to weight changes, and in this regard this application constitutes a continuation in part of our copending applications Serial No. 121,040, and Serial No. 252,874.

In many industries, particularly those in which materials such as cement, grain, fertilizer, sugar, chemicals or the like, are bagged or packaged, it is the general practice to overload packages in order to ensure against shipment of underloaded packages. The actual percentage of overloading varies from industry to industry depending upon the cost of the materials being loaded balanced against the need for mass production and the labor costs incidental to loading. However, with the loading equipments available prior to this invention, it has not generally been economical to reduce the overload percentage below 1%, and in many instances the percentage is greater than 2%. Many attempts have been made to reduce the labor costs and to render the loading equipment more accurate not only because this overload percentage represents a substantial loss of material but also because overloading gives rise to extra freight costs not directly offset by sales. However, hitherto none has been entirely successful.

There are numerous obstacles to be overcome in the construction of an improved loader. In the first place, a loader undergoes very severe treatment during operation. For example, loading 94 lb. bags of cement at a rate of 10 bags per minute represents a substantial repetitive shock on a loader scale, and for this reason the scale cannot be delicate. On the other hand crude scales and spring balances which might be more rugged are not sufficiently accurate. In addition, it is recognized in the industry that a free-swinging weigh beam is one of the prerequisites to obtaining accurate weights, but when such weigh beams are employed with automatic loading apparatus and with conventional knife edge leverage systems, they have hitherto been slow in operation and it has been impossible to attain maximum accuracy with them under mass production loading conditions.

Therefore it is an object of our invention to provide an automatic loading scale which both reduces labor costs and increases the accuracy of loading. Another object of our invention is to provide a scale for automatic loading apparatus, which is both accurate and capable of withstanding all shocks normally encountered during rapid, mass production loading. Still another object of our invention is to provide means for decreasing the time required for loading to accurate weights with reference to the position of a free-swinging weigh beam. Further objects of our invention include the provision of a scale leverage system and feed mechanism particularly adapted to enhance loading accuracy in conjunction with a counterbalance type loading scale.

In the accomplishment of these and other objects of our invention, we employ in a preferred embodiment thereof loading apparatus for containers, bags, or the like, which includes a conduit for free-flowing material, a gate valve in the conduit, means for holding a container or bag on a counterbalance type scale, said scale having a free-swinging weigh beam together with automatic apparatus controlled with reference to the position of the weigh beam for cutting off the gate valve from a bulk feed position to a dribble position, and finally for cutting it off entirely.

It is a feature of our invention that, during bulk feeding, the weigh beam rests on a switch which operates to keep the bulk feed valve open. This switch also is provided with spring mechanism or other means urging the weigh beam upwards by a force equivalent, in terms of weight, to the weight of the material falling in mid-air from the gate valve to the bag or container. This upwards force causes the weigh beam to rise, break contact with the switch, and thereby cut off the bulk feed valve before the material which is falling from the gate valve actually lands in the bag or container. This feature permits us to cut off bulk feeding without causing any sharp accelerations or decelerations in the weigh beam, and thereby promotes accuracy in bulk feeding. In conjunction with this feature, the feed gate of our invention is adapted for extremely rapid closure without transmitting shock to the weigh beam, and the weigh beam itself is damped to eliminate the effects of bulk feeding shock such that the apparatus of our invention may be employed for bulk feeding alone with better accuracy than has been hitherto feasible.

When dribble feeding is employed following bulk feeding, even greater accuracy may be attained. During dribble feeding, the weigh beam commences to rise toward the balance position in response to the increasing weight in the bag or container. It is a feature of this phase of our invention that the motion of the weigh beam is opposed by damping causing it to come to a constant rate of motion which is equivalent in terms of weight to the rate of dribble feed. As soon as the rate of weigh beam motion becomes constant, it is possible for us to predict within the range of accuracy of the dribble feed cut off arrangement, the exact weight being loaded in the bag at any instant, without the necessity of waiting for the weigh beam to come to rest. Furthermore this arrangement permits, without loss of accuracy, cutting off the bulk feed valve more closely to the balance position, and to use an optimum dribble feed rate consistent with accuracy.

Another feature of our invention relates to the suspension apparatus for the leverage system for the scale employed, and includes spring metal flexure plates in the place of knife-edged bearings. Such flexure plates have the effect of absorbing the shocks of repetitive loading without disturbing the accuracy of the scale. In addition, the flexure plates provide a supplemental restoring moment for the system when it is displaced from the balance position and thereby ensures a more rapid response to weight changes on the scale than can be obtained in the conventional knife edge suspension system. This latter feature also means that the travel of the weigh beam is reduced and that the delaying effect of deadweight in the system is minimized.

An additional feature of our invention relates to the gate valve employed in conjunction with the foregoing features and includes a tilting trough mounted in connection with a vibratory system supported independently from the conduit to be closed off thereby. In addition, the gate valve is provided with means for closing it rapidly and with a substantial force against a knife edge cut-off whereby the accuracy of weight determination or prediction is enhanced.

Further objects and features of our invention will best be understood and appreciated from a detailed description of a preferred embodiment thereof, selected for purposes of illustration and shown in the accompanying drawings in which.

The preferred embodiment of the loading apparatus of our invention herein described includes in its general organization a main supporting frame 10, a scale housing frame 12 mounted rigidly on the frame 10, a gate valve feeding mechanism indicated generally at 14 mounted on the scale frame 12, bag holding apparatus indicated at 16 mounted on a scale platform 18, counterbalance type scale mechanism located within the frame 12 and supporting the platform 18 as will be described, and automatic controls for operation of the apparatus. For purposes of introducing the description of the scale apparatus of our invention in the context of an automatic loading apparatus, we will first describe in detail the gate valve mechanism 14 and bag holding apparatus 16, and then proceed to a detailed description of the scale and associated controls.

*The gate valve*

Figure 4:
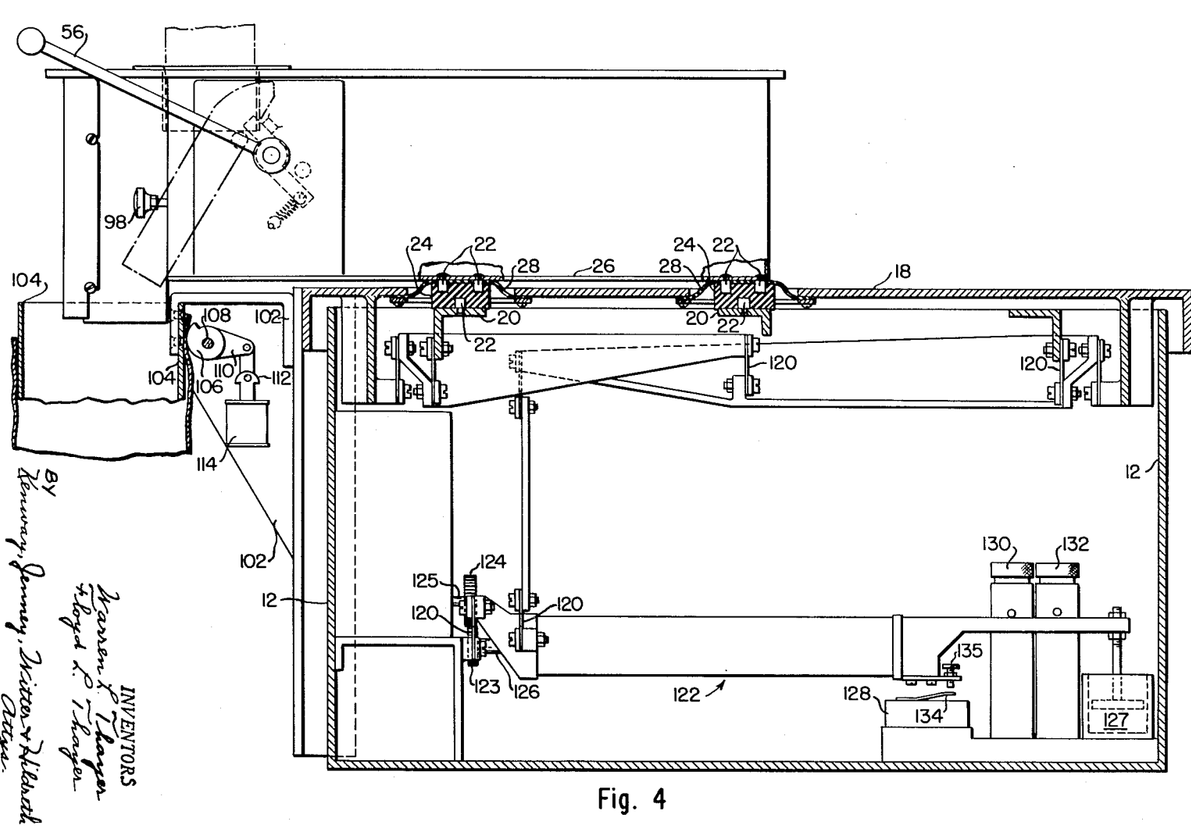
Fig. 4 is a partially sectioned view in side elevation showing the scale and loading mechanism suspension arrangement.

With reference to Fig. 4 it will be seen that the scale frame 12 is provided with angle-iron cross-support members 20 and that the gate valve mechanism 14 rests on these angle irons 20. A scale platform 18 is perforated locally to provide access for vertical studs 22 which may be seated in rubber shock-absorbing members 24 supported by cross support members 20 and supporting a base plate 26 for the gate valve. In order to provide a dustproof enclosure for the scale mechanism, the studs 22 are surrounded by a bellows 28 interconnecting the studs 22 with the scale platform 18. The bellows 28 may be made of sheet plastic such as polyvinyl chloride, Buna S or the like. Thus it will be seen that the gate valve mechanism 14 is supported directly on the scale frame 12 and the main supporting frame 10 without causing weight effect on the scale platform 18.

Turning now to Figs. 5, 6, 7 and 8, the gate valve herein employed is constructed within a substantially rectangular box having a bottom wall 26, a top wall 30, and side and end walls 32. In the forward end of the top wall 30 an aperture is provided together with a conduit 34 fitting therein. When placed beneath a hopper (not shown) an additional flanged member 36 is provided for making a dustproof seal between the conduit 34 and the bottom opening of the hopper. A tilting trough 38 is disposed directly beneath the bottom opening of the conduit 34 and is adapted to come upwards against a knife-edged member 40 attached to the forward wall of the conduit 34 and extending slightly downward from the lower extremity of the said conduit. The trough 38 serves to cut off the flow of the material through the conduit 34 and is adapted to tilt downwards in a first, steeply slanted position for bulk feeding and a second, less inclined position for dribble feeding. The bulk feeding and dribble feeding positions are shown in broken lines in Fig. 7.

The forward area of the feed gate housing surrounds the trough 38 and is isolated from the remainder of the housing by a wall 42 which serves to prevent the material from entering the areas of the feed gate mechanism which contain the control apparatus. All elements contacting the material being loaded may preferably be made of stainless steel.

The trough 38 is mounted on a transverse shaft 44 which is supported for axial rotation on the forward end of a longitudinally extending support arm 45. Arm 45 extends rearwardly through the wall 42. The aperture through which the arm 45 passes through the rear wall 42 is large enough to provide for ample vibration of the arm 45 and is sealed by means of a rubber gasket 46 secured between the wall 42 and the arm 45. The arm 45 is in turn supported by a plate 48 which is mounted on an electrical vibrating apparatus 50 which is in turn mounted on the base plate 26 of the loading gate apparatus.

The transverse shaft 44 upon which the trough 38 is mounted extends laterally through the wall 42 and the aperture through which it passes is sealed by felt pads 52 held against the wall 42 by springs 54, it being understood that the shaft 44 and trough 38 vibrate during dribble feeding.

The shaft 44 extends outwardly from the right-hand side wall 32 of the feeding apparatus where it is provided with a lever handle 56 which is used for opening the gate valve to the bulk feed position. The shaft 44 is retained in the bulk feed position by a cam 58 rigidly secured on the shaft 44, and provided with a notch 60 adapted to receive locking arm 62 which serves to hold the cam 58 and thus the trough 38 in the open position. A roller element 63 mounted on arm 62 actually makes contact with the cam 58 and ensures free relative motion between the said cam and arm. The locking arm 62 is pivotally mounted on the base frame of the gate valve operating apparatus and is further connected to an operating link 64 which extends rearwardly within the gate valve housing and connects to a solenoid 68. The solenoid 68 serves to withdraw the link 64 and in turn the locking arm 62 from the cam 58. At times when the solenoid 68 is de-energized, a spring 70 constantly urges the link 64 forward causing the locking arm 62 to remain seated in the notch 60 of the cam 58. The force tending to restore the trough 38 from the bulk feed position to the dribble feed and closed positions is provided by strong tension springs 72 urging the shaft 44 by means of arms 74 and 82 mounted on the said shaft.

Figure 7:
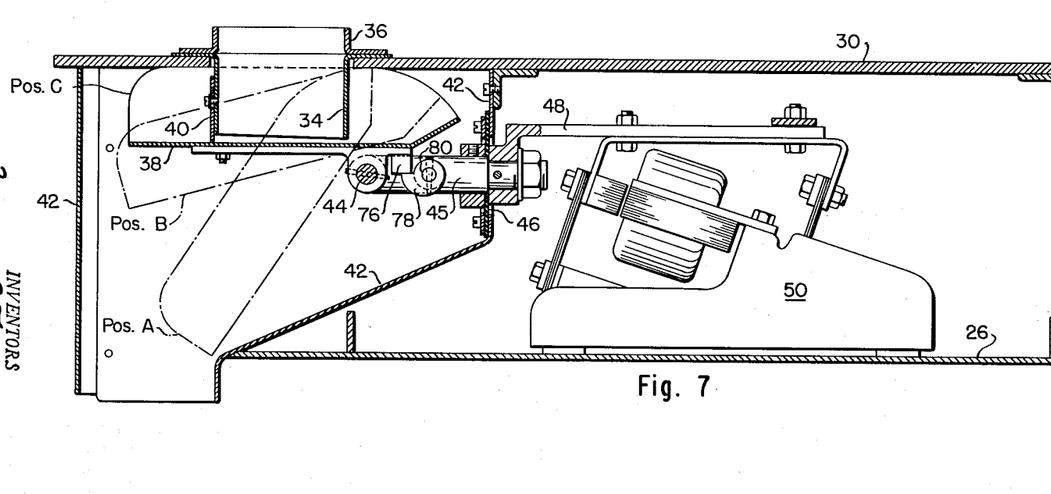
Fig. 7 is a partially sectioned view in side elevation along the lines 7—7 of Fig. 5.

When the trough 38 is released by the locking arm 62 to permit it to come to the dribble position, the trough tilts upward from an angle of approximately 60° to about 15°, and a pair of lugs 76 mounted on the base of the trough 38 to the rear of shaft 44 come in contact with a pair of cams 78 which are mounted on a transverse shaft 80 which is parallel to and to the rear of shaft 44. The shaft 80 is mounted for rotation on shaft 45 and extends to the left through the wall 42 being sealed off by a felt pad 52 and spring 54 in a manner similar to sealing the shaft 44. In Fig. 7 it will be seen that the cams 78 are in the position which permits the trough 38 to close off the conduit 34. However, when the trough 38 is in the bulk feed position, the shaft 80 rotates to bring the cams 78 upward in position to engage the lugs and stop the trough in the dribble feed position.

Figure 8:
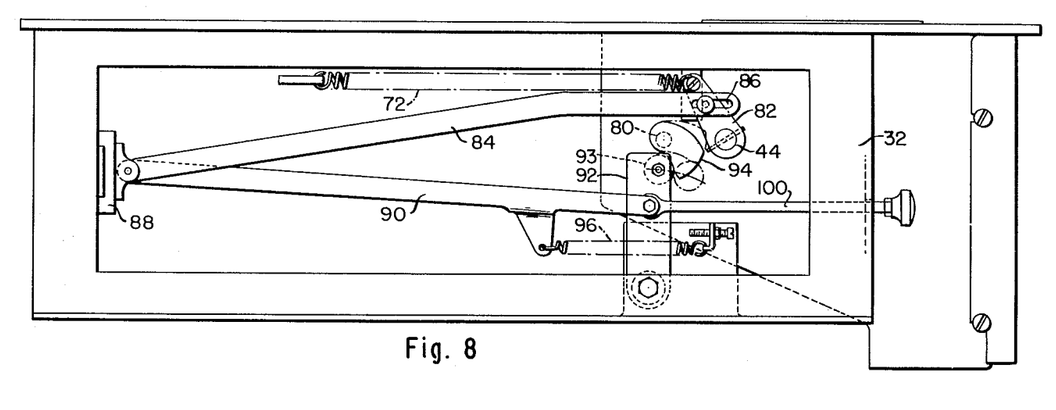
Fig. 8 is a view in side elevation along the lines 8—8 of Fig. 5.

The mechanism for rotating the shaft 80 to position the cams 78 for dribble feeding is located on the left-hand side of the feed gate apparatus and is shown more clearly in Fig. 8. When the hand lever 56 is depressed to open the trough 38 to the bulk feed position, it turns an operating arm 82 which is connected to a link 84 by means of an elongated slot 86, withdrawing the link 84 when the operating arm 82 nears the end of its stroke. The link 84 is connected in the rear to a solenoid 88 and also to another link 90 which extends forward and is pivotally connected to a locking arm 92. The upper end of the locking arm 92 engages a cam 94 mounted on shaft 82, and thus when the link 84 is drawn forward by operation of the arm 82, the link 90 moves in the same direction and tilts the cam 94, thus rotating the shaft 80 and positioning the cams 78 for stopping the trough 38 in the dribble position. The link 90 is also urged forward by a spring 96. When the trough 38 is in the closed position, as shown in Fig. 7, it will be seen that the much stronger springs 72 urge the trough closed and while the spring 96 exerts a force against cams 94 attempting to rotate shaft 80 and cams 78 to open the trough, the spring 96 is much too weak to accomplish such rotation. However, when the hand lever 56 tilts the trough 38 downward, spring 96 operates to tilt the cam 94 and thereby the cams 78 into position for stopping the trough 38 in the dribble position. The arm 92 is provided with a roller element 93 for smooth rolling contact with cam 94. It should be noted also that arms 78 contact lugs 76 at a substantial angle such that friction between cams 78 and lugs 76 is minimized when closing the gate valve from the dribble position.

Figure 5:
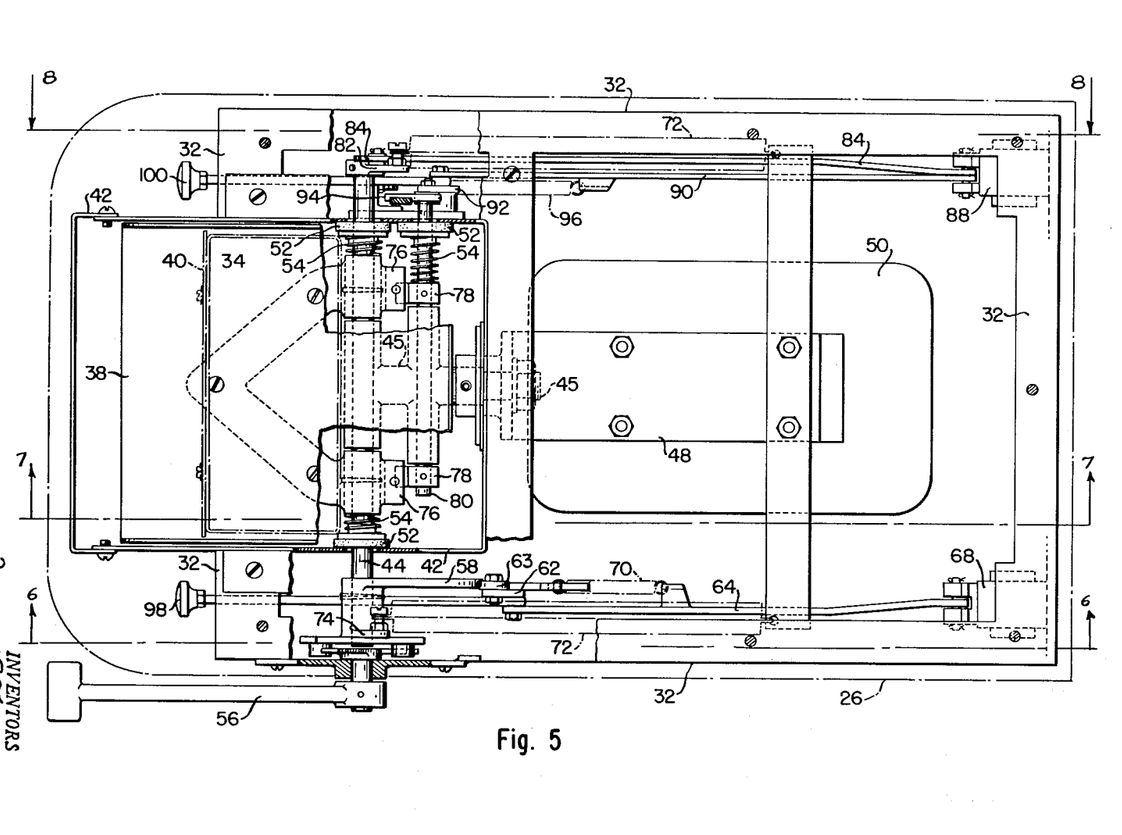
Fig. 5 is a plan view of the gate valve mechanism partially broken away for purposes of clarity.
Figure 6:
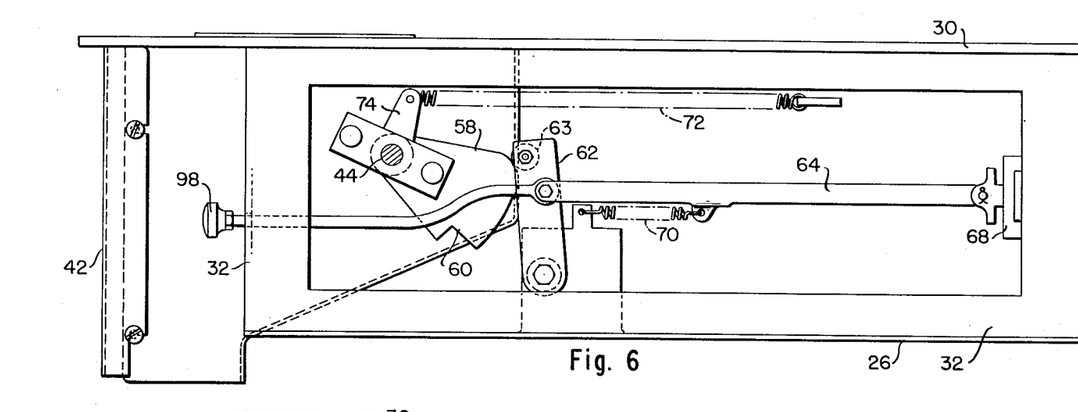
Fig. 6 is a view in side elevation along the lines 6—6 of Fig. 5.

Additional links 98 and 100 extend forward through the walls 32 and are secured at their inner ends to links 64 and 90 respectively. Links 98 and 100 provide hand operable mechanism for emergency releasing the trough 38 from the bulk feed position to the dribble feed position and from the dribble feed position to the closed position.

The operation of the gate valve herein shown is substantially as follows. The hand lever 56 is depressed so as to rotate the shaft 44 and tilt the trough 38 to the bulk feeding position. When the proper angle for the bulk feed position has been reached, the roller 63 of locking arm 62 enters notch 60 of the cam 56 which is mounted on the shaft 44. During this phase of the operation the spring 96 urges link 90 forward, tilts cam 94, rotating the shaft 80 and positioning the cams 78 for stopping the trough in the dribble position. When it is desired to discontinue bulk feeding, the solenoid 68 is operated automatically and the locking arm 62 is withdrawn thereby permitting the shaft 44 to rotate in response to the force of springs 72. Then the trough 38 tilts upward until the lugs 76 contact the cams 78 and the trough is then retained in the dribble feed position. During dribble feeding the vibrator 50 is actuated and vibrates the arm 45, the trough 38, and associated members. When it is desired to cease dribble feeding, the solenoid 88 operates automatically to withdraw the locking arm 92, permit the cam 94 to rotate shaft 80, withdraw cams 78 and permit the trough to rise to the closed position in response to the force of springs 72. The vibrator 50 continues in operation for a fraction of a second after the cams 78 have been withdrawn in order to ensure a complete closing of the trough 38 against the knife edge 40. For convenience, this is referred to as "after vibration."

It will be seen from this description that the gate valve feeding apparatus herein shown provides a completely sealed area through which the material being loaded travels as well as providing mechanism for obtaining a sharp feed cut-off. Another feature of this apparatus is that the trough 38 is vibrated independently from the conduit 34, thus permitting a more accentuated relative movement in the path of the flowing material which is being loaded.

*The bag holder*

The bag holder employed in our invention is mounted on the forward end of the scale platform 18 and includes a main support 102 upon the forward end of which is supported a member 104 for opening the mouth of the bag. The bag is held in position by eccentric clamping members 106 mounted adjacent to the inner surface of member 104 on a shaft 108. The eccentrics 106 may be knurled on their forward surface to provide a more positive grip against the bag material. Extending rearwardly from shaft 108 and mounted rigidly thereon is an operating arm 110. The operating arm 110 is connected to a link 112 which is actuated by a solenoid 114 for the purpose of releasing the eccentrics 106 from holding the bag.

Figure 1:
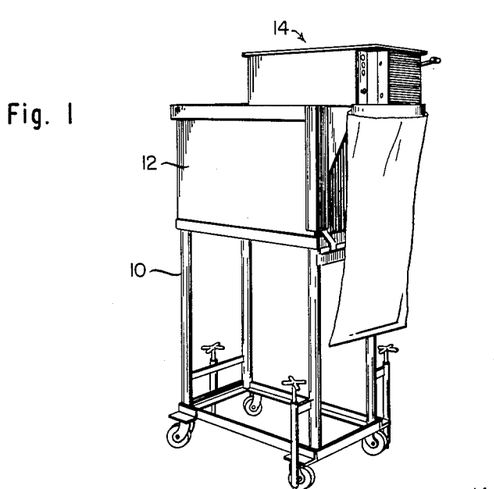
Fig. 1 is a view in perspective of the automatic loading apparatus of our invention.
Figure 2:
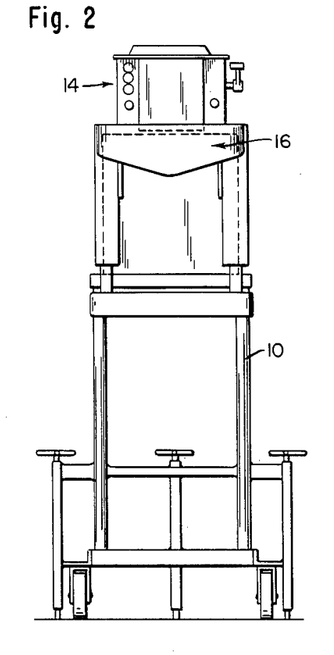
Fig. 2 is a view in front elevation thereof.
Figure 3:
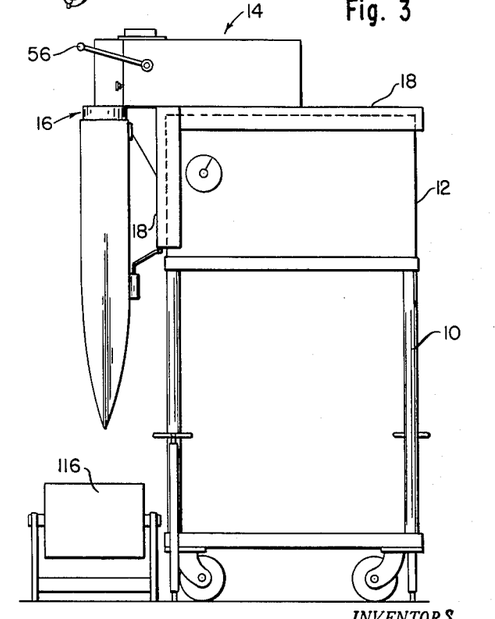
Fig. 3 is a view in side elevation thereof.

In operation an empty bag is opened and drawn up around the member 104 with the rear portion of the bag entering between the eccentrics 106 and the rear wall of the member 104 and is held in that position by the wedging action of the eccentrics 106. When the bag is being loaded, air being displaced therefrom passes upwardly through the member 104 and out the front of the apparatus where it may be taken off by a ventilation system if desired. When the bag has been fully loaded and the gate valve is closed, the solenoid 114 operates automatically or manually through link 112 and arm 110 to release the eccentric 106 and permit the bag to drop onto a conveyor 116 as shown in Fig. 3 or upon other mechanism not shown. It may be noted that in place of the bag holder any suitable support may be used for holding barrels, drums or a hopper by attaching such support rigidly to the platform 18.

*The scale*

The scale employed in the preferred embodiment of our invention herein shown in Fig. 4 is described more in detail in our copending applications Serial No. 121,040 and Serial No. 252,874, and includes a suspended leverage system in which an important feature is the absence of knife-edge bearings. In place of knife-edge bearings we employ flexure plates 120 for all fulcrums. These flexure plates are of particular importance to our invention and since they are connected directly to the weigh beam, the most sensitive element of the leverage system, they insure a rapid response to changes of weight on the scale platform 18, as will be further discussed below.

The weigh beam employed in our invention is a free-swinging weigh beam indicated at 122 and includes a movable poise (not shown) within the weigh beam which may be moved horizontally by means of a gear 123 operating through a shaft 126 which passes through the center of the weigh beam. For purposes of remotely controlling the position of the poise, a gear 124 mounted on shaft 125 may be provided to drive gear 123.

The centers of gravity of the various elements of the leverage system may be arranged with respect to the flexure plate fulcrums to give the scale the conventional pendular restoring moments when the weigh beam is deflected from the horizontal position. However, it should be noted that, while the flexure plates 120 preferably do not influence the position of the weigh beam when it is in balance, they provide the principal restoring moment to the weigh beam. In this preferred embodiment, we employ spring steel flexure plates having a thickness of .012 inch, and the restoring moment supplied by them is on the order of fourteen times that of the pendular system. For this reason it will be seen that the pendular restoring moment may be eliminated entirely, but we consider it preferable as a supplemental force. This arrangement is responsible for the extremely rapid response of my scale because far greater restoring moments are available than can be conveniently obtained in a pendular system. Furthermore, since the travel of the weight beam for a given weight change on the scale platform is greatly reduced, the harmful inertial effects of dead weight in the system are minimized.

In addition it should be noted that the motion of the weigh beam is damped by mechanism which may be a dashpot 127. The damping employed is preferably critical damping for the system, but it will be understood that minor variations above and below critical damping will not affect the operation of the scale drastically.

Basic controls

The gate valve and bag holder described above are controlled automatically by reference to the position of the weigh beam. For this purpose I provide a bulk feed cut-off switch 128, a balance cut-off switch 130, and an overweight indicating switch 132. The bulk feed cut-off switch 128 is a conventional microswitch having a direct electrical contact and a leaf spring 134. When the poise is set for loading a bag to a given weight and the bag being held by the bag holder 16 is empty, the weigh beam depresses the spring 134, opening the switch 128. The force of the spring 134 is calculated to hold the weigh beam up by an amount translated into terms of weight on the scale platform equal to the weight of material falling from the gate valve into the bag after bulk cut-off. Adjustments may be made in the effective stroke of the spring 134 by means of an adjusting screw 135 and the force of the spring may be varied by moving the switch relative to the point of contact of the screw 135. Due to the action of spring 134 the bulk feed cut-off switch 128 is sometimes referred to as the anticipator switch because the weigh beam rises and closes switch 128 in anticipation of the weight of the material falling from the gate valve into the bag after bulk cut-off. When the weigh beam has lifted from the switch 128, the trough 38 is returned to the dribble position, as will be described more in detail presently, and the vibrator 50 commences operation. During this phase of operation, the weigh beam commences to rise in response to the additional weight caused by dribble feeding, and due to the dashpot 127, the rate of upward motion of the weigh beam soon becomes constant and proportional in terms of equivalent weight to the dribble feed rate. When the weigh beam 122 approaches the balance position, it trips switch 130, a frictionless switch such as magnetic or photo-electric, which operates to close the gate valve. It will be seen therefore, that the switch 130 will be positioned below the balance point by a distance also equivalent in terms of weight to the amount by which the weigh beam lags the actual weight in the bag plus the weight of the material falling from the gate valve into the bag. Under these conditions the loading weight attained is extremely accurate and is limited only by the inaccuracies which may be inherent in the flow of material through the dribble feed valve, and the dribble feed cut-off.

The wiring diagram

Figure 9:
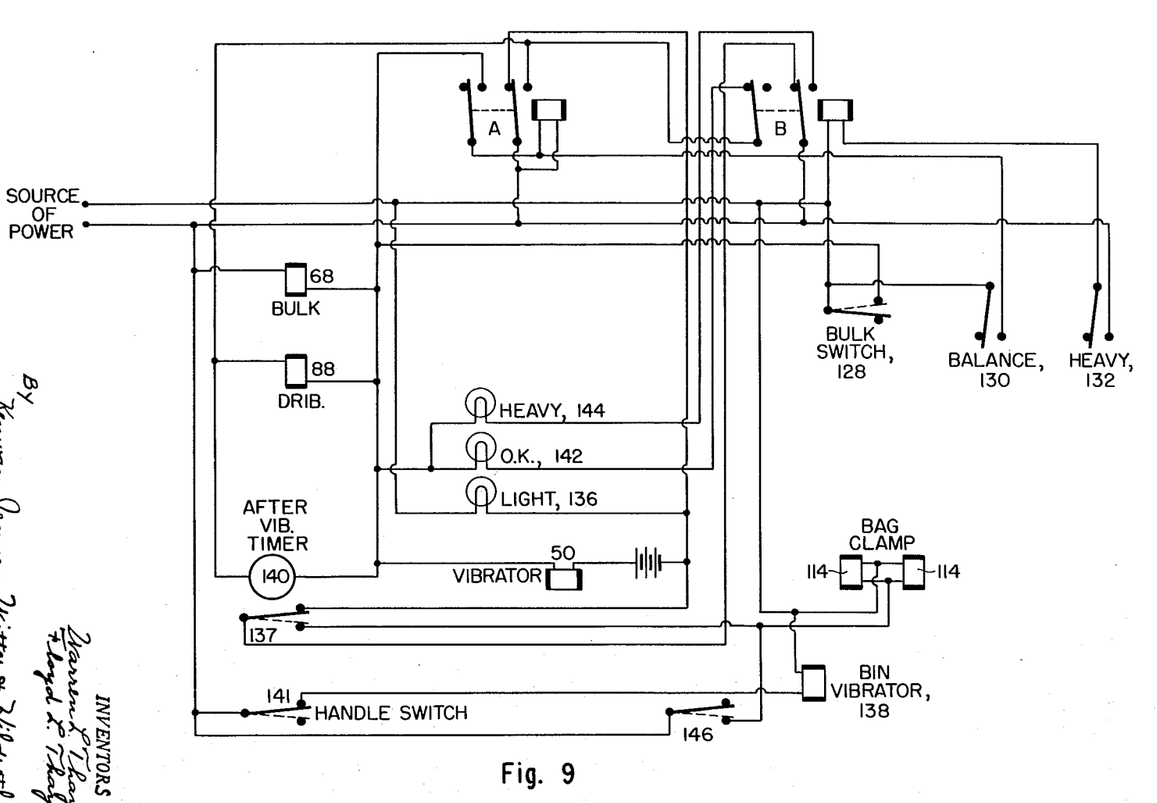
Fig. 9 is a wiring diagram illustrating the electrical connections employed in our invention.

Further details included in the control system of our preferred embodiment and the wiring diagram therefor will now be described. Standard electrical supply is employed and may be introduced through a master switch 133. When the master switch 133 is turned on and there is no weight on the scale, a circuit is completed through an underweight indicating light 136. This circuit includes the source of power, the light 136, a first relay designated A in its normal de-energized position and the power return line. A bin vibrator 138 may be energized by operation of a gate handle switch 141 in series with the source of power and the bin vibrator 138 so that the bin vibrator operates only while the gate is open.

It will be remembered that prior to loading the bag, the weigh beam 122 depresses switch 128 holding the same in the open position during bulk feeding. When the bag has been filled to the desired amount by bulk feeding less the amount of material falling from the gate valve into the bag, the weigh beam rises from switch 128 with the assistance of leaf spring 134 and at this instant the switch 128 is closed and a circuit is made through the switch 128 to the bulk feed cut-off solenoid 68, thereby causing the gate valve to come to the dribble position. When the switch 128 is closed, a second circuit is also made which includes the source of power, the switch 128, the dribble feed vibrator 50, a switch 137, a relay designated as B in its normal de-energized position, and the power return line. Thus, the vibrator 50 is energized during dribble feeding.

After the switch 128 has closed and the gate valve has come to the dribble position, dribble feeding continues until the weigh beam rises and closes switch 130. When this is accomplished a circuit is made which energizes relay A thus breaking the circuit to the underweight indicating light 136. When relay A is energized it closes three additional circuits. The first of these is the dribble feed cut-off circuit and includes the source of power, the switch 128, the dribble feed cut-off solenoid 88, relay A in the energized position, and the return power line. In parallel with this circuit is an "after vibration" timer 140 which will be described more in detail below but which is started when dribble feeding is cut off. The second circuit energized at this time includes the source of power, the beam switch 128, an indicating light 142 for designating that the weight in the bag is proper, relay B in the de-energized position, relay A in the energized position and the return power line. At this time although the dribble feed has been cut off it was found desirable to continue the operation of vibrator 50 for a short time in order to eliminate any particles which may have become lodged between the trough 38 and the knife-edged cut-off 40. For this purpose the "after vibration" timer 140 was energized as above noted and it serves to break the circuit to the dribble feed vibrator 50 after a period of less than one second by repositioning a double throw switch 137. When the timer 140 throws the switch 137 into its second position, an additional circuit is completed for the purpose of releasing the bag clamp. This circuit includes the source of power, the bag clamp solenoids 114, the switch 137, the relay B in its normal, de-energized position and the return power line.

When relay A is energized it also completes a holding circuit which includes the source of power, the switch 128, the relay A and its energizing coil, and the return power line. This circuit operates to keep relay energized after the switch 130 opens and until the weigh beam drops down far enough to open switch 128.

If the dribble feed flow happens to be inaccurate for some reason, or if the operator disturbs the bag during feeding, the weigh beam 122 may raise and trip the overweight switch 132. This will complete a circuit which energizes relay B. When this occurs, relay B breaks the circuit to the balance indicating light 142 and makes a circuit to a heavy weight indicating light 144. Throwing relay B also has the effect of breaking the circuit through double throw switch 137 and means that the bag clamp solenoids 114 will not thereafter automatically de-energize when the "after vibration" timer throws switch 137. In other words, an overweight bag will not automatically become discharged from the loading scale, and this perforce calls the attention of the operator to the fact that the bag is overweight. For discharging overweight bags a hand switch 146 is provided in series with the source of power and the bag clamp solenoids 114.

It will be recognized that conventional relays and switches may be employed in the foregoing arrangement. However, it is imperative that switches 130 and 132 do not influence the operation of the weigh beam and for this reason, switches 130 and 132 may preferably be magnetically operated switches employing extremely light working elements, or photo-electric switches which do not influence the weigh beam in any manner. Such switches at present are sold under various trade names by many companies.

Operation

A brief summary of the operation of the scale of our invention will now be described. The apparatus is first properly positioned and located beneath a hopper or connected to a standard screw-feeding mechanism or the like. When in position and ready for operation with poise properly located for loading a given weight of material, a bag is inserted in place on the bag holder 16 and thereafter the hand lever 56 is depressed to position the trough 38 for bulk feeding. The bin vibrator may be energized at this time. When the weight in the bag together with the weight of the column of material falling from the gate valve into the bag, has reached the point where it becomes desirable to cut off bulk feeding, the weigh beam rises, closing switch 128, energizes solenoid 68 which operates to release the trough 38 permitting it to come to the dribble position. During dribble feeding, the trough 38 is vibrated by the vibrator 50 and the weigh beam rises at a constant rate substantially equivalent in terms of weight to the rate of dribble feed. Thereafter the switch 130 is closed causing the solenoid 88 to be energized and permit the gate 38 to return to the closed position. Vibrator 50 continues to vibrate for a short interval governed by timer 140, for the purpose of assuring complete gate closing, at the end of which time the bag clamp is released and the bag falls onto the conveyor 116. If the bag is overloaded the vibrator stops but the bag clamp does not release because of the closing of switch 132, and such must be done by operation of the hand switch 146. If for any other reason the operator desires to shut off the gate valve, he may do so by means of hand links 98 and 100. It will be understood, of course, that adjustment for loading different weights may be made by moving the poise within the weigh beam 122 by operation of gear 124. In the preferred embodiment herein shown, weight adjustments between 1 and 200 pounds may be made.

*Variations*

Certain minor variations of this preferred embodiment of our invention will be evident to those skilled in the art. For instance, it is considered that numerous other types of free-swinging weight beam scales may be adapted to conform to the spirit of our invention. In particular, a bench dial type scale might readily be provided with anticipator mechanism as described in connection with the switch 128 and spring 134. The spring 134 might be replaced by other means urging the weigh beam upward including electro-magnetic mechanism or the like. The flexure plate suspension system could be employed either in part or altogether in a number of other types of scales and as far as the restoring moment of the flexure plate system is concerned, this might be attained magnetically, photo-electrically, or by carefully adjusted springs in other locations within the scale, so long as the restoring moment is substantially uniform and proportional to the deflection of the weigh beam. Furthermore it is also considered to be within the scope of this invention that the anticipating mechanism could be designed to operate on the scale platform itself rather than on the weigh beam. Thus a weight equal to the weight of the material falling from the gate valve into the bag could be placed upon the scale platform during bulk feeding and at the instant the weigh beam rises from the switch 128, this weight could be automatically lifted free and clear from the scale platform.

It should be noted that the apparatus of our invention may be readily adapted for bulk feeding alone. This may be done in two ways. First, by means of anticipator mechanism acting in conjunction with the flexure plate suspension system or its equivalent as herein taught. In such a context the weigh beam would be positioned initially at an angle below balance equivalent translated into terms of weight on the scale platform to the predicted weight of the material which would be falling from the gate valve into the bag at the instant of cutting off bulk feeding. The anticipator would then urge the weigh beam upward by a force also equivalent to the weight of the said falling material and thus the weigh beam will rise, break contact and cause the bulk feed to cut-off at the proper instant. Due to the supplemental restoring moment of the flexure plate suspension system, the response to bulk feeding in the scale of our invention is far more rapid than has hitherto been feasible in this type of scale, and while minor variations in the rate of flow cannot be avoided, nevertheless a greatly improved bulk feeding accuracy can be obtained in this manner.

The second way in which bulk feeding alone may be handled in the apparatus of our invention is by following the same mode of operation as is employed in dribble feeding. This may be done by increasing the effectual restoring moment of the flexure plates and thereby decreasing the angle through which the weigh beam must pass to represent a given weight change. Thus the weigh beam may be started at a zero point in a substantially free-swinging condition when it is depressed below horizontal and as the bag or container is filled at a bulk feeding rate, the weigh beam will commence to rise in response to the increased weight on the scale platform, and due to the damping will attain a uniform rate of rise equivalent and proportional to the rate of flow of material into the bag or container. When following this procedure, the gate valve will be closed when the weigh beam reaches a position below horizontal equivalent to the factor by which the weigh beam lags the weight actually in the container plus the predicted weight of material falling from the gate valve. It will be understood with this arrangement that it will be desirable to keep the actual travel of the weigh beam to a minimum in order to avoid the disadvantageous effects of inertias arising from the rapid accelerations and decelrations of the system, and for this reason an extremely sensitive cut-off mechanism may be required.

Other variations of this type will be apparent to those skilled in the art after coming to an understanding of our invention, and therefore it is not intended to confine the invention to the specific embodiment herein shown, but rather to limit it in terms of the appended claims.

Having thus described and disclosed a preferred embodiment of our invention, what we claim as new and desire to secure by Letters Patent is:

1. Apparatus for filling containers to a given weight of material wherein a container is supported on a counterbalance type scale having a weigh beam adapted to assume a balance position and other positions deflected from said balance position and wherein feed mechanism for said container is controlled automatically with reference to the position of the weigh beam of said scale, said apparatus comprising in combination, anticipator mechanism for said weigh beam including stops limiting the motion of said weigh beam to either side of the balance position and means urging said weigh beam from the underweight stop toward the balance position but not influencing said weigh beam as it approaches the said balance position, whereby, during the filling operation, the weigh beam will commence moving toward the balance position in advance of the weight of material actually in said container, said means having a force roughly equivalent in terms of weight on the scale to the weight of the material falling from the feed mechanism into the container; means providing a pendular restoring moment and means providing an additional restoring moment for said weigh beam when the weigh beam is not in the balance position, said additional restoring moment being the principal restoring moment, and being linear and proportional to the deflection of the weigh beam from the balance position; and substantially critical damping means for said weigh beam.

2. Apparatus for filling containers to a given weight of material wherein a container is supported on a counterbalance type scale having a weigh beam adapted to assume a balance position and other positions deflected from said balance position and wherein feed mechanism for said container is controlled automatically with reference to the position of the weigh beam of said scale, said apparatus comprising in combination, a conduit for said feeding mechanism, a tilting trough operatively associated with said conduit to close off the same or to tilt and open the same, suspension means for said tilting trough being adapted with a vibrator and being independent of said conduit, said conduit and tilting trough being further isolated from the counterbalance scale by shock-absorbing means; critical damping for the weigh beam of said scale; and said scale having a pendular restoring moment and additional means including flexure plates for providing the principal restoring moment proportional to the deflection of said weigh beam from the balance position.

3. Apparatus for filling containers to a given weight of material wherein a container is supported on a counterbalance type scale having a weigh beam adapted to assume a balance position and other positions deflected from said balance position and wherein feed mechanism for said container is controlled automatically with reference to the position of the weigh beam of said scale, said apparatus comprising in combination; an overweight indicator, means actuating said overweight indicator when said beam rises above the balance position, means for automatically releasing said container from said scale, means preventing said container from being released from said scale when said overweight indicator is actuated, said scale having a pendular restoring moment, critical damping, and means for supplying to said scale the principal restoring moment proportional to the deflection of the weigh beam from the balance position.

4. Apparatus for filling containers to a given weight of material wherein a container is supported on a counterbalance type scale having a weigh beam adapted to assume a balance position and other positions deflected from said balance position and wherein feed mechanism for said container is controlled automatically with reference to the postion of the weigh beam of said scale, having in combination; means for feeding at a bulk feed rate, means for cutting off bulk feeding including a switch associated with said beam and a spring urging said beam upward by a force equivalent in terms of weight on the scale platform to the weight of material falling from the feeding mechanism into the container whereby bulk feeding may be cut off without giving rise of marked accelerations in said weigh beam; means for dribble feeding, means for cutting off dribble feeding including a balance cut off switch associated with said weigh beam; critical damping for said weigh beam whereby during dribble feeding said weigh beam will commence to rise at a constant rate proportional to the dribble feed rate; said balance cut off switch being positioned relative to said weigh beam below the balance position by an amount equivalent in terms of weight to the factor by which the weigh beam lags the weight of material in said container plus the weight of material falling from the dribble feed means into the container; and means for promoting rapid response in the scale system including a flexure plate suspension arrangement for said weigh beam adapted to provide the principal force urging said weigh beam toward the balance position by a force proportional to the deflection of the weigh beam away from the balance position.

5. Apparatus for filling containers to a given weight of material wherein said material is supported on a counterbalance type scale having a weigh beam and said weigh beam is pivotally mounted to assume a balance position and other positions deflected from said balance position and wherein feed mechanism for said material is controlled automatically with reference to the position of said weigh beam, said apparatus comprising in combination, means providing a pendular restoring moment urging said weigh beam towards said balance position, means independent of gravity providing an additional restoring moment urging said weigh beam towards said balance position, said additional restoring moment being the principal restoring moment for said weigh beam and being linear and proportional to the deflection of said weigh beam from the balance position, and substantially critical damping means for said weigh beam.

References Cited in the file of this patent

UNITED STATES PATENTS

| Number | Name | Date |
|---|---|---|
| 36,867 | Taurines | Nov. 14, 1862 |
| 262,905 | Roeder | Aug. 15, 1882 |
| 278,904 | Emery | June 5, 1883 |
| 340,012 | Springer | Apr. 13, 1886 |
| 800,632 | Curtin | Oct. 3, 1905 |
| 830,682 | Soderquist | Sept. 11, 1906 |
| 1,667,930 | Edmunds | May 1, 1928 |
| 1,759,886 | Bousfield | May 27, 1930 |
| 2,058,775 | Cundall | Oct. 27, 1936 |
| 2,346,882 | Vredenburg | Apr. 18, 1944 |
| 2,364,832 | Weckerly | Dec. 12, 1944 |
| 2,402,217 | Vredenburg | June 18, 1946 |
| 2,546,193 | Lindstaedt | Mar. 27, 1951 |
| 2,597,831 | Willis | May 20, 1952 |
| 2,605,075 | Brown | July 29, 1952 |